United States Patent
Ohira et al.

(10) Patent No.: US 9,003,284 B2
(45) Date of Patent: Apr. 7, 2015

(54) INFORMATION SEARCH APPARATUS AND SYSTEM

(75) Inventors: Hidetaka Ohira, Fuchu (JP); Toshihiko Manabe, Kamakura (JP); Yojiro Tonouchi, Inagi (JP); Ryuzo Okada, Kawasaki (JP); Mieko Asano, Kawasaki (JP); Tsukasa Ike, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 554 days.

(21) Appl. No.: 13/369,417

(22) Filed: Feb. 9, 2012

(65) Prior Publication Data

US 2012/0139859 A1    Jun. 7, 2012

Related U.S. Application Data

(63) Continuation of application No. PCT/JP2009/065000, filed on Aug. 27, 2009.

(51) Int. Cl.
| G06F 17/00 | (2006.01) |
| G06K 9/00 | (2006.01) |
| G06F 3/01 | (2006.01) |
| G06F 3/0488 | (2013.01) |

(52) U.S. Cl.
CPC ............ *G06K 9/00436* (2013.01); *G06F 3/018* (2013.01); *G06F 3/04883* (2013.01); *G06K 2209/011* (2013.01)

(58) Field of Classification Search
CPC .................................................... G06F 17/242
USPC ................................................. 715/262, 263
See application file for complete search history.

(56) References Cited

U.S. PATENT DOCUMENTS

| 4,317,109 A | * | 2/1982 | Odaka et al. ............. 382/187 |
| 5,109,352 A | * | 4/1992 | O'Dell .................... 715/262 |
| 5,467,407 A | * | 11/1995 | Guberman et al. ........ 382/186 |
| 5,796,867 A | * | 8/1998 | Chen et al. .............. 382/187 |
| 6,094,506 A | * | 7/2000 | Hullender ................. 382/186 |

(Continued)

FOREIGN PATENT DOCUMENTS

| JP | 07-085074 | 3/1995 |
| JP | 08-305722 | 11/1996 |

(Continued)

OTHER PUBLICATIONS

Calhoun et al., Recognizing Multi-Stroke Symbols, Google 2002, pp. 1-9.*

(Continued)

*Primary Examiner* — Cong-Lac Huynh
(74) *Attorney, Agent, or Firm* — Amin, Turocy & Watson, LLP

(57) ABSTRACT

According to one embodiment, an information search apparatus includes a generation unit, a selection unit, a search unit and a display unit. The generation unit generates recognition candidate character strings based on shapes of strokes and combinations of the shapes. The selection unit calculates reliability values for the recognition candidate character strings and selects search keys from the recognition candidate character strings. The search unit searches a database for second character strings including the search keys, and obtains one or more result character strings indicating search results of each of the search keys. The display displays the one or more result character strings corresponding to each of the search keys distinctively.

13 Claims, 6 Drawing Sheets

(56) References Cited

U.S. PATENT DOCUMENTS

| | | | |
|---|---|---|---|
| 6,094,666 A * | 7/2000 | Li | 715/263 |
| 6,341,176 B1 * | 1/2002 | Shirasaki et al. | 382/229 |
| 6,694,056 B1 * | 2/2004 | Ito et al. | 382/186 |
| 7,007,233 B1 * | 2/2006 | Iwayama | 715/258 |
| 7,380,203 B2 * | 5/2008 | Keely et al. | 715/230 |
| 7,669,122 B2 * | 2/2010 | O'Dell | 715/263 |
| 7,949,515 B2 * | 5/2011 | Chakra et al. | 704/8 |
| 8,156,414 B2 * | 4/2012 | Zandifar et al. | 714/807 |
| 8,521,751 B2 * | 8/2013 | Ichino | 707/754 |
| 2002/0071607 A1 | 6/2002 | Kawamura et al. | |
| 2003/0020726 A1 * | 1/2003 | Charpentier | 345/603 |
| 2004/0126017 A1 * | 7/2004 | Seni et al. | 382/229 |
| 2005/0114773 A1 * | 5/2005 | Thacker | 715/541 |
| 2007/0016858 A1 * | 1/2007 | Lee | 715/535 |

FOREIGN PATENT DOCUMENTS

| | | |
|---|---|---|
| JP | 2001-184458 | 7/2001 |
| JP | 3974359 | 6/2007 |
| JP | 2008-243033 | 10/2008 |
| JP | 2009-069973 | 4/2009 |

OTHER PUBLICATIONS

Aparna et al., Online Handwriting Recognition for Tamil, IEEE 2004, pp. 1-6.*

Masui, An Efficient Text Input Method for Pen-based Computers, ACM 1998, pp. 1-8.*

English Translation of the International Preliminary Report on Patentability from the International Bureau of the Patent Cooperation Treaty for International Patent Application No. PCT/JP2009/065000 Dated Mar. 22, 2012, 6 pgs.

Japanese Office Action for Japanese Patent Application No. 2011-528562 mailed Oct. 8, 2013.

First Office Action of Reasons for Rejection for Japanese Patent Application No. 2011-528562 Dated May 21, 2013, 6 pgs.

International Search Report for International Application No. PCT/JP2009/065000 mailed on Nov. 10, 2009.

Written Opinion for International Application No. PCT/JP2009/065000 mailed on Nov. 10, 2009.

Tonouchi, et al. Online Overlapping Handwriting Recognition—New Character Input Interface for Mobile Phones, Special Reports, vol. 62, No. 12, 2007.

* cited by examiner

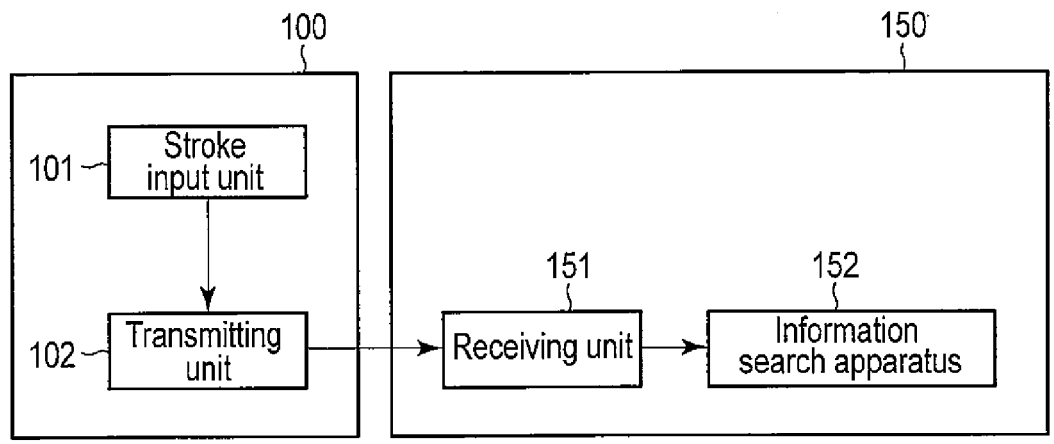
F I G. 1
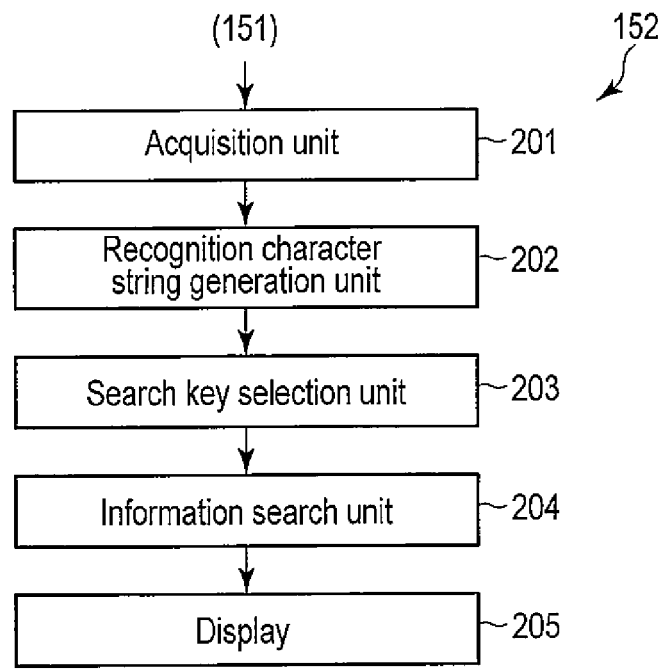
F I G. 2

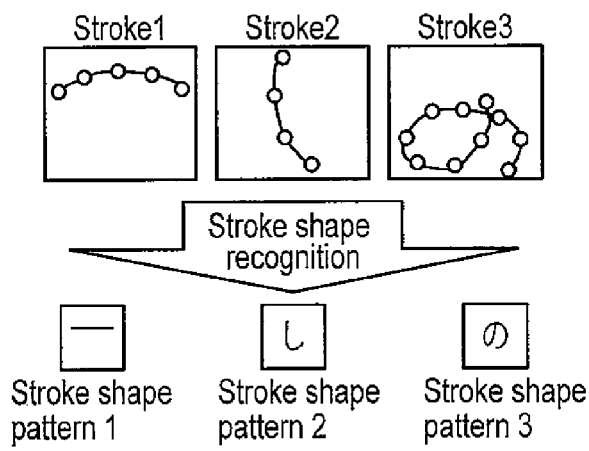
F I G. 3
| Input character string | Additional character string |
|---|---|
| しこ (shiko) | も (mo) |
| も (mo) | しこ (shiko) |
| つい (tsui) | や (ya) |
| しよ (shiyo) | は (ha) |
| うい (ui) | ふ (fu) |
401  402
F I G. 4
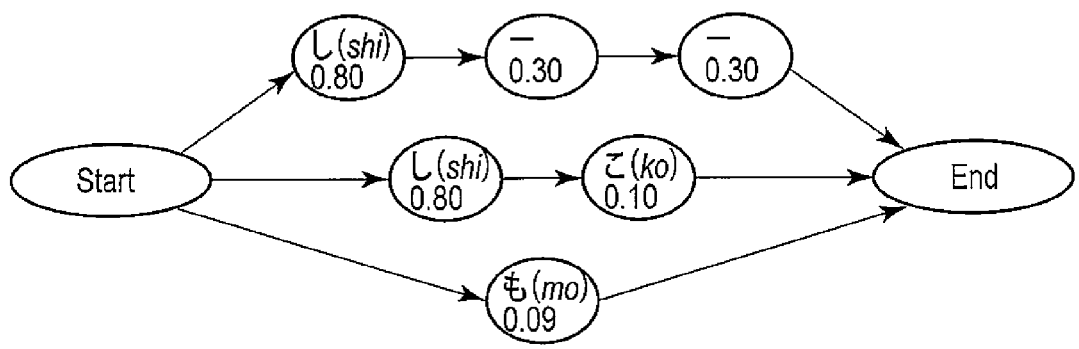
F I G. 5

| Input character string | Additional character string | Value |
|---|---|---|
| しこ (shiko) | も (mo) | 0.9 |
| も (mo) | しこ (shiko) | 0.75 |
| つい (tsui) | や (ya) | 0.5 |
| しよ (shiyo) | は (ha) | 0.9 |
| うい (ui) | ふ (fu) | 0.8 |
| しこ (shiko) | に (ni) | 0.6 |

FIG. 6

| Reading | Content |
|---|---|
| もーつぁると (mo-tuaruto) | Mozart (mo-tuaruto) |
| もーがん (mo-gan) | Morgan (mo-gan) |
| やまとなでしこ (yamatonadeshiko) | 大和撫子 (yamatonadeshiko) |
| しこく (shikoku) | 四国 (shikoku) |
| にんにん (ninnin) | 忍忍 (ninnin) |

FIG. 7

INFORMATION SEARCH APPARATUS AND SYSTEM

CROSS REFERENCE TO RELATED APPLICATIONS

This application is a Continuation Application of PCT Application No. PCT/JP2009/065000, filed Aug. 27, 2009, the entire contents of which are incorporated herein by reference.

FIELD

Embodiments described herein relate generally to an information search apparatus and system.

BACKGROUND

Devices have been provided which can combine one or more input strokes together to generate a plurality of candidate character strings and output the generated candidate character strings (See, e.g., U.S. Patent Application Publication No. 2002/071607).

BRIEF DESCRIPTION OF THE DRAWINGS

FIG. 1 is a block diagram illustrating an information search system including a remote control unit and an information search apparatus;

FIG. 2 is a block diagram illustrating the information search apparatus according to the present embodiment;

FIG. 3 is a diagram illustrating a method for recognizing stroke shapes based on strokes;

FIG. 4 is a diagram illustrating an example of a recognition candidate table;

FIG. 5 is a diagram illustrating a character candidate path used to determine character recognition reliability values;

FIG. 6 is a diagram illustrating an example of a recognition candidate table containing values for misrecognition probabilities;

FIG. 7 is a example of an information search database;

DETAILED DESCRIPTION

Figure 8:
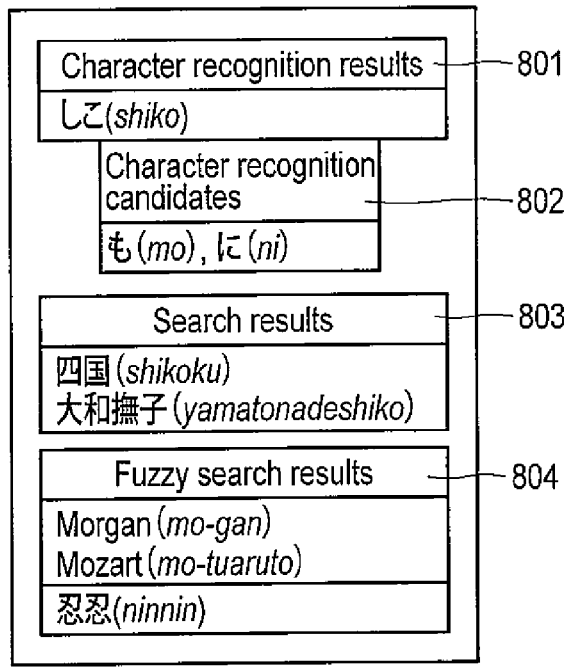
FIG. 8 is a diagram illustrating a first example of a method for display performed by a display of the information search apparatus.

If information is searched for using, as a search key, only one candidate character string generated from input strokes, the user's intended search key may fail to be obtained when an input character is misrecognized in a character recognition process. On the other hand, if information is searched for using a plurality of candidate character strings as search keys, presenting the user's intended search result to the user may be difficult owing to an increased number of search results.

In general, according to one embodiment, an information search apparatus includes an acquisition unit, a generation unit, a selection unit, a search unit and a display unit. The acquisition unit is configured to acquire one or more strokes, each of the strokes is represented by a set of positional coordinates of a part of a coordinate input device touched by a handwriting input device after the handwriting input device comes into touch with the coordinate input device before the handwriting input device releases the coordinate input device. The generation unit is configured to generate, as one or more recognition candidate character strings, one or more first character strings according to shapes of the strokes and combinations of the shapes. The selection unit is configured to calculate reliability values for the recognition candidate character strings and to select a plurality of search keys from the recognition candidate character strings in descending order of the reliability values, the reliability values indicates reliabilities of the recognition candidate character strings to a user's intended character string. The search unit is configured to search, for second character strings comprising the search keys, a database comprising one or more third character strings, and to obtain one or more result character strings indicating search results of each of the search keys. The display is configured to display the one or more result character strings, corresponding to each of the search keys distinctively, with respect to each search key.

Information search apparatus and system according to the embodiments will be described in detail with reference to the accompanying drawings. In the embodiments below, like reference numbers denote like elements, and duplicate explanation.

First Embodiment

An information search apparatus and system according to the present embodiment will be described in detail with reference to FIGS. 1 and 2.

FIG. 1 is a block diagram of an information search system included a remote control unit 100 and a display system 150. The information search apparatus according to the present embodiment is used for communications between the remote control unit 100 and the display system 150. The remote control unit 100 includes a stroke acquisition unit 101 and a transmitting unit 102. The display system 150 includes a receiving unit 151 and an information search apparatus 152.

First, the remote control unit 100 will be described in detail.

The stroke acquisition unit 101 includes a coordinate input device such as a touchpad or a touch panel. Moreover, the stroke acquisition unit 101 acquires a stroke sequence including a plurality of strokes input by a user using a handwriting input device. The handwriting input device is, for example, a finger or a pen, and may be any device allowing the user's handwriting to be expressed.

Furthermore, the stroke represents the coordinates of a portion of the coordinate input device touched by the handwriting input device after the moment when the handwriting input device comes into touch with the coordinate input device before the moment when the handwriting input device releases the coordinate input device; the coordinates are expressed on a two-dimensional plane using an x-axis and a y-axis. For example, if t denotes the moment when the handwriting input device comes into contact with the coordinates on the coordinate input device, (x(t), y(t)) represents the coordinates of the portion of the coordinate input device touched by the handwriting input device and the time point when the handwriting input device comes into touch with the coordinate input device. If t=0 denotes the time point corresponding to the moment when the handwriting input device comes into touch with the coordinate input device and t=n (n is any positive number) denotes the time point corresponding to the moment when the handwriting input device releases the coordinate input device, one stroke can be expressed by a set of coordinate values (x(0), y(0)), (x(1), y(1)), ..., (x(n), y(n)). A stroke sequence represents a set of a plurality of strokes.

The transmitting unit 102 receives a stroke sequence from the stroke acquisition unit 101, and transmits coordinate information items that represent the stroke sequence to the display device 150.

The display system 150 according to the present embodiment will be described in detail.

The receiving unit 151 receives the coordinate information from the transmitting unit 102 to obtain the stroke sequence from the coordinate information.

The information search apparatus 152 receives the stroke sequence from the receiving unit 151 and combines the strokes together to generate a plurality of candidates for character strings (hereinafter referred to as recognition candidate character strings). Here, the character string may be one character. The information search apparatus 152 performs a search operation using the recognition candidate character strings as search keys. The information search apparatus 152 then presents the results of the search to the user. The detailed operation of the information search apparatus 152 will be described below with reference to FIG. 2 to FIG. 8. The display system 150 is, for example, a television or a display, and may be any apparatus configured to allow the user to visually recognize information.

Now, the information search apparatus 152 according to the present embodiment will be described in detail with reference to FIG. 2.

The information search apparatus 152 includes an acquisition unit 201, a recognition character string generation unit 202, a search key selection unit 203, an information search unit 204, and a display 205.

The acquisition unit 201 receives a stroke sequence from the receiving unit 151 of the display system 150.

The recognition character string generation unit 202 receives the stroke sequence from the acquisition unit 201, and performs a character recognition process based on the stroke sequence. The recognition character string generation unit 202 thus obtains recognition candidate character strings that are one or more character strings serving as candidates for character strings input by the user. The character recognition process performed by the character string generation unit 202 will be described below with reference to FIG. 3.

The search key selection unit 203 receives the one or more recognition candidate character strings generated by the recognition character string generation unit 202. Then, the search key selection unit 203 sequentially selects one or more the recognition candidate character strings as one or more search keys in descending order of character recognition reliability based on the results of the character recognition.

The information search unit 204 receives the search keys from the search key selection unit 203. The information search unit 204 searches an information search database with character strings such as television program names and personal names stored therein for a character string containing a search key, in descending order of character recognition reliability of the search key. The information search unit 204 thus obtains, for each search key, a character string corresponding to the result of the search using the search key. The string character corresponding to the search result is hereinafter referred to as a result character string. The information search database may be included in the information search apparatus 152 or be resident on a network.

The display 205 receives search keys and result character strings from the information search unit 204. The display 205 then associates the search keys with the result character strings, and displays search results so that the character strings corresponding to the search results are displayed at different positions according to search key.

An example of a character recognition process based on combinations of stroke shapes will be described in detail with reference to FIG. 3.

First, the recognition character string generation unit 202 recognizes a stroke shape from a stroke. The stroke shape is a particular character shape into which the stroke is classified. The stroke shape may itself form a character and is a set of elements that may form one stroke of a character. For example, in FIG. 3, a stroke 1 expressing a horizontal line is recognized as a stroke shape pattern 1 "—". A stroke 2 expressing a straight line extending downward and a counterclockwise circular arc located at the end of the stroke is recognized as a stroke shape pattern 2 " し (shi)". Similarly, a stroke 3 expressing a circular arc extending downward and a succeeding clockwise circle is recognized as a stroke shape pattern 3 " の (no)".

Then, the recognition character string generation unit 202 combines stroke shapes together to generate one or more recognition candidate character strings.

As an example will be described in which character strings are generated by combining stroke shapes together. For example, for the three strokes shown in FIG. 3, a combination of the stroke shapes recognized as "—", " し ", and " の " allows generation of a character string " あ (a)" with three strokes in which each of these strokes forms one stroke of the character. Similarly, a combination of the stroke shapes recognized as " し ", "—", and "—" allows generation of a character string " も (mo)" with three strokes in which each of these strokes forms one stroke of the character.

Moreover, one or more recognition character strings are generated which are conceivable from combinations of stroke shapes obtained from the same stroke sequence. One or more recognition character strings are generated because a stroke sequence input by the user may fail to be recognized as the user's intended character string but may be misrecognized as a different character string expressed by the same stroke sequence. That is, by way of example, even though the user inputs a stroke sequence intended to be the character string " も ", the stroke sequence may be misrecognized as a character string " に (ni)" expressed by the same stroke sequence.

Examples of combinations of stroke shapes obtained from the same stroke sequence will be described. For example, if the strokes of the stoke sequence " し ", "—", and "—" are each considered to be an element of one character, the stroke sequence allows generation of the character string " も " or " に ". Moreover, if the strokes of the stoke row " し ", "—", and "—" are each considered to be an element of two characters, the stroke sequence allows generation of a character string " し こ ". If the strokes of the stoke row " し ", "—", and "—" are each considered to be an element forming one character, the stroke sequence allows generation of a character string " し — — ". That is, all the possible combinations conceivable from the one stroke sequence " し ", "—", and "—" allow generation of one or more character strings " も ", " に ", " し こ " and " し — — ". All the possible combinations conceivable from the stroke shapes are determined to be recognition candidate character strings.

One or more recognition candidate character strings can be obtained by, for example, using a general character recognition engine in a character recognition process to combine stroke shapes to obtain a plurality of character recognition results. Alternatively, a recognition candidate table is used to pre-associate combinations of stroke shapes with one another so as to allow a plurality of recognition candidate character strings different from those obtained by the character recognition engine to be obtained from the input stroke sequence. The recognition candidate table is a table in which character strings likely to be misrecognized in handwriting input are associated with one another.

Now, an example of the recognition candidate table will be described in detail with reference to FIG. 4.

An input character string 401 is associated with an additional character string 402; the input character string 401 is based on the character recognition results, and the additional character string 402 is obtained by combining together stroke shapes based on the same stroke sequence as that for the input character string 401. That is, character strings likely to be misrecognized are associated with one another. Input character strings 401 and additional character strings 402 corresponding to the input character strings 401 is obtained as a plurality of recognition candidate character strings by referencing to this correspondence relationship.

For example, if the character string input by the user is recognized as "しこ" based on the stroke sequence "し", "—", and "—", the character string "しこ" and the additional character string 402 " ち " corresponding to the input character string 401 "しこ" can be determined to be recognition candidate character strings. Similarly, if the character string input by the user is recognized as "つい (tsui)" based on the stroke sequence "つ (tsu)" and "い (i)", the character string "つい" and an additional character string 402 "や (ya)" corresponding to the input character string 401 "つい" can be determined to be recognition candidate character strings. Moreover, if the input character string 401 is "しよ (shiyo)", an additional character string 402 "は (ha)" corresponds to the input character string 401. If the input character string 401 is "うい (ui)", an additional character string 402 "ふ (fu)" corresponds to the input character string 401. In addition to the input characters 401, these additional character strings 402 can also be determined to be recognition candidate character strings.

In the above-described method for generating recognition candidate character strings, a recognition candidate character string is formed of strokes which are the same in number as the input strokes. However, strokes may be predicted which are to be input after the preciously input strokes so that character strings formed of the previously input strokes and strokes predicted to be input after the currently input strokes can be generated as recognition candidate character strings. For example, if three strokes "—", "—", and "|" are input, then in addition to a character string " ち " and the like which are formed of these strokes, a character string "き (ki)" and the like which are formed of "—", "—", "|", and "_" may be generated as recognition candidate character strings.

Now, a method by which the search key selection unit 203 calculates a character recognition reliability value will be described in detail with reference to FIG. 5. In this method, the character recognition reliability value is obtained by calculating the product of state transition probabilities based on character string candidate paths.

For example, FIG. 5 shows character string candidate paths for the strokes "し", "—", and "—". For the character strings "し——", "しこ", and " ち " generated from the strokes "し", "—", and "—" obtained from the same stroke sequence, the character recognition reliability can be determined by shifting state sets corresponding to the character strings.

Now, the method for calculating character recognition reliability values will be described with reference to specific examples. The character recognition reliability values indicate reliabilities of the recognition candidate character strings to a user's intended character string. It is assumed that an upper character described in one state is generated by combining stroke shapes with one another and that a lower number is the probability of the state. Then, the character string "し——" has a character recognition reliability value of 0.80×0.30×0.30=0.072. The character string "しこ" has a character recognition reliability value of 0.80×0.10=0.08. The character string " ち " has a character recognition reliability value of 0.09. Hence, the character string " ち ", having the largest character recognition reliability value, is determined to be the user's intended character string.

With reference to FIG. 6, a method will be described in detail in which character recognition reliability values are calculated with the recognition candidate table used in the method by which the search key selection unit 203 generates recognition candidate character strings. Here, the character recognition reliability value is calculated by using the recognition candidate table in FIG. 4 to which misrecognition probabilities are added.

For example, if the character recognition engine recognizes the stroke sequence input by the user as "しこ", the character string output by the character recognition engine is defined to be the most reliable. The character string output by the character recognition engine thus has a character recognition reliability value 601 of 1.0, which is the maximum value. Then, the recognition candidate table shown in FIG. 6 is referenced to determine the character recognition reliability value 601 of the additional character string " ち " corresponding to the input character string "しこ" to be 0.9. Likewise, the additional character string "にこ" corresponding to the input character string "しこ" is determined to have a character recognition reliability value 601 of 0.6. Similarly, if the result of recognition carried out by the character recognition engine is " ち ", the input character string " ち " is determined to have a character recognition reliability value of 1.0. The additional character string "しこ" is determined to have a character recognition reliability value 601 of 0.75. If the result of recognition performed by the character recognition engine is "つい", the input character string "つい" is determined to have a character recognition reliability value of 1.0. The additional character string "や" is determined to have a character recognition reliability value 601 of 0.5.

In a plurality of recognition candidate character strings, a given number of top recognition candidate character strings based on the character recognition reliability values, for example, top four recognition candidate character strings, are selected as search keys in descending order of character recognition reliability value. In this case, a threshold may be used to select search keys from the recognition candidate character strings. For example, if character string candidate paths are used to calculate character recognition reliability values, and the threshold is 0.075, then the character strings "しこ" and " ち " are selected as search keys because the character strings have character recognition reliability values of 0.08 and 0.09, respectively, both of which are greater than the threshold. On the other hand, the character string "し——" has a character recognition reliability value of 0.072, which is smaller than the threshold, and is thus not selected as a search key.

Moreover, the state probability may be weighted based on the association of the character string input by the user with the preceding and succeeding character strings and/or an input stroke preceding the stroke of interest. Furthermore, search keys may be selected based on a combination of the method of selection in descending order of character recognition reliability and the determination based on the threshold.

Now, an example of an information search database will be described in detail with reference to FIG. 7. For example, the following character strings are stored in the information search database in association with one another: character strings indicative of the contents 702 of television programs, persons, and the like, and character strings indicative of reading 701 of the television programs and personal names. For example, if the recognition candidate character string "も (mo)" is used as a search key, the information search unit 204 obtains the character strings "Morgan(mo-gan)" and "Mozart(mo-tuaruto)" as result character strings for the search key "も (mo)" because a part of hiragana reading of "Morgan(mo-gan)" and a part of hiragana reading of "Mozart (mo-tuaruto)" match the search key "も (mo)".

Similarly, if the recognition candidate character string "しこ (shiko)" is used as a search key, the information search unit 204 determines the character strings "四国 (shikoku)" and "大和撫子 (yamatonadeshiko)" to be result character strings for the search key "しこ (shiko)" because a part of "しこく (shikoku)" and a part of "やまとなでしこ (yamatonadeshiko)" match the search key "しこ (shiko)".

Finally, an example of display of results of a search using a recognition candidate character string as a search key will be described in detail with reference to FIG. 8. FIG. 8 shows the results of a search using, as search keys, "しこ" and "も", generated as recognition candidate character strings for the stroke sequences "し", "—", and "—". The search key "しこ" with the largest character recognition reliability value is displayed in a character recognition result list box 801, the highest list box. The search keys "も" and "に" with character recognition reliability values equal to or greater than the threshold are displayed in a character recognition candidate list box 802, the second highest list box.

The result character strings "四国 (shikoku)" and "大和撫子 (yamatonadeshiko)" for the search key "しこ (shiko)" are displayed in a character recognition result list box 803, the third highest list box. Finally, "Morgan(mo-gan)" and "Mozart(mo-tuaruto)", result character strings for the search key "も (mo)", and "忍忍 (ninnin)", a result character string for the search key "に (ni)", are displayed in a fuzzy search result list box 804, the lowest list box. As described above, each of the search keys and the result character strings are displayed in the list boxes in association with one another so as to distinguish the display positions thereof from one another. This allows the user to easily recognize the search results.

According to the above-described first embodiment, even if misrecognition occurs in a character recognition process, a plurality of recognition candidate character strings are generated to enable the user's intended search key to be obtained. Furthermore, in spite of an increase in the number of search results as a result of the use of a plurality of search keys, search keys are displayed distinctively from one another and result character stings, that is, search results, are also displayed distinctively from one another, allowing the user's intended search result to be easily obtained.

Second Embodiment

An information search apparatus according to a second embodiment is different from the information search apparatus according to the first embodiment in a display method performed by the display 205.

A search key of the highest order based on character recognition reliability value and its result character strings are displayed distinctively from search keys of the second and subsequent highest orders and their result character strings. The distinctive display may include displaying the result character strings at different positions according to search key or using any attribute of characters to display sets of each of search keys and its result character strings distinctively from one another by using the same character attribute for each set. Here, the attributes of characters include the color of the character, the size of the character, the type of the character including an italic type and a bold type, character ornamentation such as an underlined character and a shaded character, and animation of the character including blinking of the character.

An example of a method for display performed by the display 205 will be described in detail with reference to FIG. 9.

Figure 9:
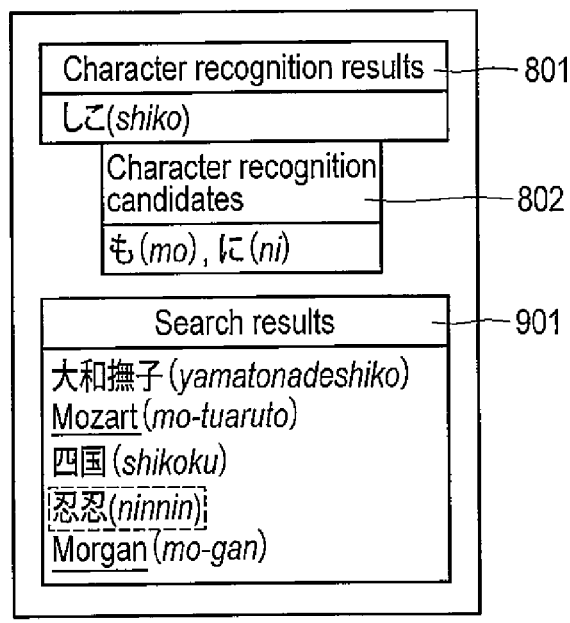
FIG. 9 is a diagram illustrating a second example of a method for the display.

FIG. 9 shows the results of a search using, as search keys, "しこ (shiko)", "も (mo)", and "に (ni)" generated as recognition candidate character strings. The search key "しこ (shiko)" has the highest order in the search keys "しこ (shiko)", "も (mo)", and "に (ni)" selected by the search key selection unit 203. Thus, "しこ (shiko)" is displayed in the character recognition result list box 801, whereas "も (mo)" and "に (ni)" are displayed in the character recognition candidate list box 802.

Moreover, the following are collectively displayed in a search result list box without distinction: result character strings indicative of search results using the search key present in the character recognition result list box 801 and result character strings indicative of search results using the search keys present in the character recognition candidate list box 802. Thus, the result character strings are distinguished from one another using different character attributes for the respective character strings. For example, "大和撫子 (yamatonadeshiko)" and "四国 (shikoku)" are the results of a search using the search key "しこ (shiko)", "Mozart(mo-tuaruto)" and "Morgan(mo-gan)" are the results of a search using the search key "も (mo)", and "忍忍 (ninnin)" is the result of a search using the search key "に (ni)". Thus, the attributes can be distinguished from one another by associating together the result character strings in the search result list box 901 resulting from the search using the same search key and displaying the associated result character strings with the same character ornamentation. For example, "大和撫子 (yamatonadeshiko)" and "四国 (shikoku)" are displayed with no character ornamentation, "Mozart(mo-tuaruto)" and "Morgan(mo-gan)" are underlined, and "忍忍 (ninnin)" is enclosed by a dashed line. If the attributes are distinguished from one another based on, for example, the color of the character, instead of character ornamentation, "大和撫子 (yamatonadeshiko)" and "四国 (shikoku)" are displayed in black, "Mozart(mo-tuaruto)" and "Morgan(mo-gan)" are displayed in red, and "忍忍 (ninnin)" is displayed in blue.

Another example in which character strings are displayed distinctively from one another using the character ornamentation attribute will further be described in detail with reference to FIG. 10.

Here, a particular search key and corresponding result search strings are displayed with the same character ornamentation. Since "(yamatonadeshiko)" and "(shikoku)" are the results of the search using the search key "(shiko)", the search key "(shiko)" and the character strings "(yamatonadeshiko)" and "(shikoku)" are displayed with no character ornamentation. Similarly, since "Mozart(mo-tuaruto)" and "Morgan(mo-gan)" are the results of the search using the search key "(mo)", the search key "(mo)" and the character strings "Mozart(mo-tuaruto)" and "Morgan(mo-gan)" are underlined. Since "(ninnin)" is the result of the search using the search key "(ni)", the search key "(ni)" and the character string "(ninnin)" are enclosed by a dashed line. Thus, sets of each of search keys and its result character strings are distinguished from one another by using the same attribute for each set.

Figure 10:
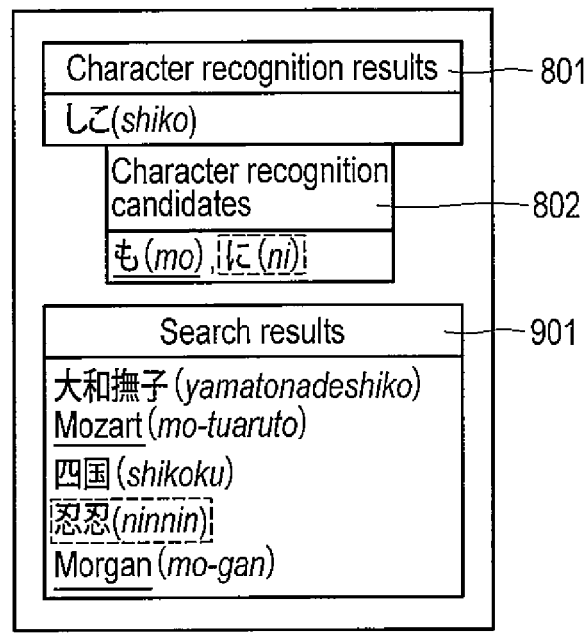
FIG. 10 is a diagram illustrating a third example of a method for the display.

In FIG. 9 and FIG. 10, the sets of each of particular search keys and its result character strings are distinguished from one another by using the same character ornamentation attribute for each set. However, in addition, this attribute may be combined with another attribute such as the font or size of the character. Alternatively, at the same time, the sets of each of search keys and its result character strings may be distinguished from one another based on the display position.

Additionally, the display 205 may display the result character strings in the search result list box 901 in descending order of priority. The priority is an indicator determined by, for example, the character recognition reliability value of the recognition character string, the number of hits for the result character string in the search results, the number of previous searches for the same character string, or the linear or weighted sum thereof.

The number of hits in the search results refers, in, for example, information search for television programs, to the number of television programs related to a result character string such as "大和撫子 (yamatonadeshiko)" obtained using a search key such as "しこ (shiko)". Furthermore, the number of previous searches for the same character string refers to the number of references to a result character string such as "大和撫子 (yamatonadeshiko)" obtained using a search key such as "しこ (shiko)". If the character recognition reliability value of the search key is used as the priority, character recognition reliability values calculated using, for example, a character string candidate path such as the one shown in FIG. 5 may be used as described above.

An example of a method for display based on the priority will be described in detail with reference to FIG. 11 and FIG. 12.

Figure 11:
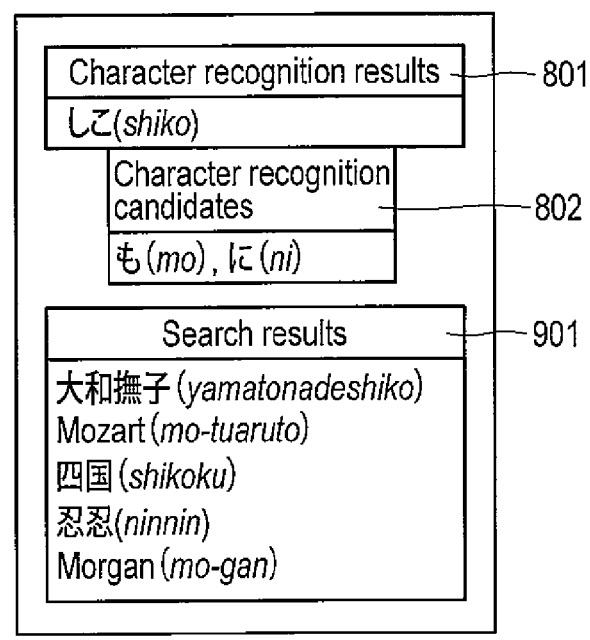
FIG. 11 is a diagram illustrating a fourth example of a method for the display.
Figure 12:
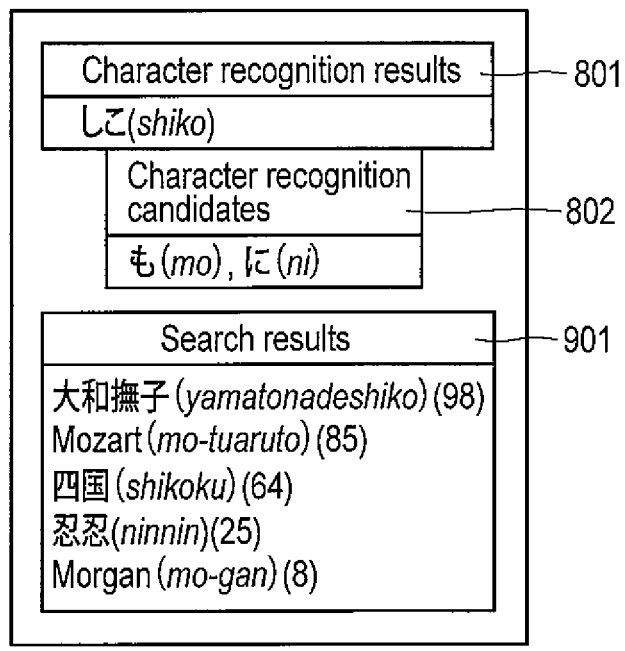
FIG. 12 is a diagram illustrating a fifth example of a method for the display.

In FIG. 11 and FIG. 12, "しこ (shiko)", "も (mo)", and "に (ni)" are selected by the search key selection key 203 as search keys. The search keys and the results of searches carried out by the information search unit 204 using the search keys, "四国 (shikoku)", "大和撫子 (yamatonadeshiko)", "Morgan(mo-gan)", "Mozart(mo-tuaruto)" and "忍忍 (ninnin)", are displayed in the display 205 according to the priority, in descending order of priority. FIG. 12 shows numerical values for the priorities, which are displayed in parentheses on the right side of the respective search results. Here, the numbers of hits in the search results are used as the priorities.

The numerical values may be used so as to allow the user to recognize the priorities of the search results as shown in FIG. 12. Alternatively, as shown in FIG. 11, relevant processes may be performed in the background in descending order of search result priority, and the character strings corresponding to the search results may be displayed in the search result list box 901 with the numerical values of the priorities not displayed therein.

According to the above-described second embodiment, sets of each of particular search keys and its result character strings are displayed distinctively from one another based on the attribute of the character string. This allows the user to determine which search key has been used to obtain the search result.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information search apparatus, comprising:
an acquisition unit configured to acquire one or more strokes, each of the strokes being represented by a set of positional coordinates of a part of a coordinate input device touched by handwriting input device after the handwriting input device comes into touch with the coordinate input device before the handwriting input device releases the coordinate input device;
a generation unit configured to generate, as one or more recognition candidate character strings, one or more first character strings according to shapes of the strokes and combinations of the shapes;
a selection unit configured to calculate reliability values for the recognition candidate character strings and to select a plurality of search keys from the recognition candidate character strings, in descending order of the reliability values, the reliability values indicating reliabilities of the recognition candidate character strings to a user's intended character string;
a search unit configured to search, for second character strings comprising the search keys, a database comprising one or more third character strings indicative of reading, and to obtain one or more result character strings indicating search results of each of the search keys; and
a display configured to display the one or more result character strings, corresponding to each of the search keys distinctively, with respect to each search key.

2. The apparatus according to claim 1, wherein the display displays the one or more result character strings searched by different search key at different positions.

3. The apparatus according to claim 1, wherein the display displays the search keys and the result character strings, the result character strings searched by the same search key being indicated with same attribute including a character ornamentation.

4. The apparatus according to claim 3, wherein the display displays a second search key with the greatest reliability value and one or more first result character strings corresponding to the second search key in distinction from one or more third search keys and one or more second result character strings corresponding to the third search keys, based on at least one of the attribute and the display position of the result character strings.

5. The apparatus according to claim 3, wherein the attribute comprises a color of a character, a font of the character, a size of the character, a type of the character comprising an italic type and a bold type, character ornamentation comprising an underline and shading, and animation of the character comprising blinking of the character.

6. The apparatus according to claim 1, wherein the display displays the search keys and the result character strings, a first search key of the search keys and the result character strings searched by the first search key being indicated with same attribute including a character ornamentation.

7. An information search apparatus, comprising:
an acquisition unit configured to acquire one or more strokes, each of the strokes being represented by a set of positional coordinates of a part of a coordinate input device touched by handwriting input device after the handwriting input device comes into touch with the coordinate input device before the handwriting input device releases the coordinate input device;

a generation unit configured to generate one or more first character strings according to shapes of the strokes and combinations of the shapes, and to generate a recognition candidate character string comprising the first character strings;

a selection unit configured to select, as search keys, the recognition candidate character string and at least one of additional character strings corresponding to the recognition candidate character string from a table in which a plurality of recognition candidate character strings, the additional character strings, and values are stored in association with one another, the additional character strings each indicating a string based on shapes of the strokes identical to strokes of the recognition candidate character string and combinations of the shapes, the values each indicating a probability that the recognition candidate character string is misrecognized as one of the additional character strings, the additional character strings being selected in descending order of the values;

a search unit configured to search, for second character strings comprising the search keys, a database comprising one or more third character strings indicative of reading, and to obtain one or more result character strings indicating search results of each of the search keys; and a display configured to display the one or more result character strings, corresponding to each of the search keys distinctively, with respect to each search key.

8. An information search system, comprising:

a remote control unit configured to acquire a coordinate information items indicating one or more strokes, the strokes represented by a set of positional coordinates of a part of a coordinate input device touched by handwriting input device after the handwriting input device comes into touch with the coordinate input device before the handwriting input device releases the coordinate input device, and configured to transmit the coordinate information item;

a receiving unit configured to receive the coordinate information items from the remote control unit;

an acquisition unit configured to acquire the strokes;

a generation unit configured to generate, as one or more recognition candidate character strings, one or more first character strings according to shapes of the strokes and combinations of the shapes;

a selection unit configured to calculate reliability values for the recognition candidate character strings and to select a plurality of search keys the one or more recognition candidate character strings in descending order of the reliability values, the reliability values indicating reliabilities of the recognition candidate character strings to a user's intended character string;

a search unit configured to search, for second character strings comprising the search keys, a database comprising one or more third character strings indicative of reading, and to obtain one or more result character strings indicating search results of each of the search keys; and a display configured to display the one or more result character strings, corresponding to each of the search keys distinctively, with respect to each search key.

9. The system according to claim 8, wherein the display displays the one or more result character strings searched by different search key at different positions.

10. The system according to claim 8, wherein the display displays the search keys and the result character strings, the result character strings searched by the same search key being indicated with same attribute including a character ornamentation.

11. The system according to claim 10, wherein the display displays a second search key with the greatest reliability value and one or more first result character strings corresponding to the second search key in distinction from one or more third search keys and one or more second result character strings corresponding to the third search keys, based on at least one of the attribute and the display position of the result character strings.

12. The system according to claim 10, wherein the attribute comprises a color of a character, a font of the character, a size of the character, a type of the character comprising an italic type and a bold type, character ornamentation comprising an underline and shading, and animation of the character comprising blinking of the character.

13. The system according to claim 8, wherein the display displays the search keys and the result character strings, a first search key of the search keys and the result character strings searched by the first search key being indicated with same attribute including a character ornamentation.

* * * * *